United States Patent
Karp et al.

(10) Patent No.: US 7,995,303 B2
(45) Date of Patent: Aug. 9, 2011

(54) OVERHEAD CALCULATION IN WRITING SYNCHRONIZED DATA TO MAGNETIC TAPE

(75) Inventors: James M. Karp, Tucson, AZ (US); Takashi Katagiri, Yamato (JP); Motoko Oe, Yamato (JP); Yutaka Oishi, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 12/551,280

(22) Filed: Aug. 31, 2009

(65) Prior Publication Data

US 2011/0051280 A1    Mar. 3, 2011

(51) Int. Cl.
*G11B 15/46* (2006.01)
(52) U.S. Cl. .......... 360/73.04; 360/71; 360/73.01; 710/53
(58) Field of Classification Search .......... None
See application file for complete search history.

(56) References Cited

U.S. PATENT DOCUMENTS

| | | | | |
|---|---|---|---|---|
| 4,410,942 A * | 10/1983 | Milligan et al. | | 710/61 |
| 6,459,540 B1 * | 10/2002 | Beavers et al. | | 360/73.08 |
| 6,856,479 B2 | 2/2005 | Jaquette et al. | | |
| 6,958,878 B2 * | 10/2005 | Jaquette et al. | | 360/73.04 |
| 7,710,681 B2 * | 5/2010 | Itagaki et al. | | 360/73.01 |
| 7,903,363 B2 * | 3/2011 | Itagaki et al. | | 360/71 |
| 2008/0007856 A1 * | 1/2008 | Tango et al. | | 360/53 |
| 2009/0063763 A1 * | 3/2009 | Katagiri | | 711/111 |
| 2009/0296268 A1 * | 12/2009 | Katagiri et al. | | 360/77.12 |

* cited by examiner

*Primary Examiner* — Jason C Olson
(74) *Attorney, Agent, or Firm* — Griffiths & Seaton PLLC

(57) ABSTRACT

Various embodiments for writing received synchronized data to magnetic tape having a plurality of wraps using a magnetic tape drive adapted for performing the writing according to an available plurality of predefined tape speeds are provided. In one such embodiment, for each of the available plurality of predefined tape speeds, an average overhead per synchronized command for performing a recursively accumulated backhitchless flush (RABF) cycle is calculated. One of the available plurality of predefined tape speeds having a lowest calculated average overhead is selected. The RABF cycle is performed using the selected one of the available plurality of predefined tape speeds.

20 Claims, 2 Drawing Sheets

OVERHEAD CALCULATION IN WRITING SYNCHRONIZED DATA TO MAGNETIC TAPE

CROSS-REFERENCE TO RELATED APPLICATIONS

This application is related to U.S. application Ser. No. 10/058,101, filed Jan. 29, 2002, now U.S. Pat. No. 6,856,479, issued Feb. 15, 2005, which is incorporated herein by reference.

BACKGROUND OF THE INVENTION

1. Field of the Invention

The present invention relates in general to computers, and more particularly to a method, system, and computer program product for incorporating a calculation of overhead into a method for writing synchronized data to magnetic tape media in a computing environment.

2. Description of the Related Art

Magnetic tape provides a means for physically storing data which may be archived or which may be stored in storage shelves of automated data storage libraries and accessed when required. Data stored in this manner has an aspect of permanence, which allows copies of the data stored in memory or disk at a host system to be erased, knowing that a copy exists on magnetic tape. The available storage space at the host system is relatively expensive, and there is a desire to release the storage space as soon as possible. Hence, data is typically transferred through an intermediate staging buffer, such as a hard disk, to the tape drive, and there is also a desire to release and overwrite the staging buffer as soon as possible. Thus, it is often desirable to "synchronize" the data.

"Synchronized data" is defined as data or other information that is subject to a "synchronizing event" or similar command requiring the tape drive to not return "Command Complete" to a write type of command, or an indication that the command has been or will be successfully executed, until it has actually committed the data to media, specifically, the magnetic tape. As the result, if power is lost, the data can be recovered from the tape, whereas it may not be recoverable from a volatile DRAM storage of the tape drive buffer.

One example of a synchronizing event is a Write Filemark command with the Immediate bit set to "0". This means that the drive is not to respond immediately, but instead is to respond when the command has completed, meaning that any data sent as part of the command is written out to tape. A specialized case of a Write Filemark command is where the number of Filemarks field is also set to "0", meaning that the Write Filemark command has no data of its own, and all data which precedes the command must be written to tape before a command complete is sent. Hence, this command is often referred to as a "Synchronize" command, as is known to those of skill in the art.

Another example of a synchronizing event is a host selectable write mode known to those of skill in the art as "non-buffered writes", where an implicit synchronize must be performed after each record is written from the host. "Command Complete" is not returned for any write command until the data is successfully written on media. Herein, writing any data record, group of records, or other mark, is defined as a "transaction", and writing such data record, etc., as the result of a synchronizing event is defined as a "synchronized transaction".

A difficulty with respect to magnetic tape is that the data is recorded sequentially without long gaps between data sets, whereas synchronized transactions are stored in separate bursts for each synchronizing event, with a noticeable time period before writing the next transaction. This requires that the tape drive "backhitch" after writing the synchronized transaction in order to write the next transaction closely following the preceding transaction. Tape is written or read while it is moved longitudinally at a constant speed. Hence, a backhitch requires that the tape be stopped, reversed to beyond the end of the previous transaction, stopped again, and accelerated up to speed in the original direction by the time that the end of the previous transaction is reached. As is understood by those of skill in the art, the backhitch process consumes a considerable amount of time, and, if a large number of small synchronized transactions are to be stored, the throughput of the tape drive is reduced dramatically. As an example, backhitch times can vary from about half a second to over three seconds.

SUMMARY OF THE INVENTION

In the related U.S. Pat. No. 6,856,479 incorporated by reference above, a method for writing synchronized tape is provided that reduces the number of backhitches. In one such embodiment of that method, a controller detects a pattern of synchronizing events for received data records to be written to tape, writes each transaction of data records to the magnetic tape, accumulates the synchronized transactions in a buffer, and subsequently recursively writes the accumulated transactions of data records from the buffer to the magnetic tape in a sequence. A single backhitch may be employed to place the recursively written accumulated data records following the preceding data. This and other embodiments of this method may be termed a "Recursively Accumulated Backhitchless Flush," or RABF cycle, as will be referred to herein. When the host transfers a small amount of data and issues a synchronization command repeatedly, the tape drive enters a RABF mode of operation. The drive then moves to a work or temporary area of the tape, and writes the data temporarily without an accompanying backhitch. After the temporary area is fully used, the drive returns from the temporary area to the original area and recursively writes the data (which was written on the temporary area) on the original area. Pursuant to RABF cycles, the number of backhitches is reduced, and performance of the drive is maximized over normal writing in situations where the host application transfers a small amount of data and issues a synchronization command repeatedly.

In general, pursuant to RABF cycles, the tape drive writes the data with the fastest tape speed on the temporary area because the data can be written in the shortest time. The throughput from drive to tape is therefore defined by the tape speed and the linear density on the tape. In some situations, however, writing the data in the temporary area using a slower tape speed may improve performance. In one such situation, the host does not immediately transfer the data following a synchronization command. In this situation, the synchronization command is sent and received by the drive, yet the host application does not immediately transfer data. Meanwhile, the drive head is located over the temporary area, and the drive is waiting for the subsequent data. In other words, in such a situation, the total amount of data to be written on the temporary area is smaller, and the occurrence of recursive writing (which contributes to the overhead of a RABF cycle) increases. If a smaller tape speed is implemented in this case, the area of the temporary tape to run without writing is smaller than the case with faster tape speeds. This means that use of the smaller tape speed may reduce the occurrence of recursive writing, and result in better throughput.

To address situations where latency between the synchronization command and receipt of data is higher (and a default position of the fastest tape speed in the temporary area doesn't necessarily result in the highest performance), a need exists for a mechanism whereby the RABF cycle incorporates a consideration of factors in an overhead calculation, in order to select an appropriate tape speed to maximize throughput and performance in such situations.

Accordingly, various embodiments for writing received synchronized data to magnetic tape having a plurality of wraps using a magnetic tape drive adapted for performing the writing according to an available plurality of predefined tape speeds are provided. In one such embodiment, for each of the available plurality of predefined tape speeds, an average overhead per synchronized command for performing a recursively accumulated backhitchless flush (RABF) cycle is calculated. One of the available plurality of predefined tape speeds having a lowest calculated average overhead is selected. The RABF cycle is performed using the selected one of the available plurality of predefined tape speeds.

Related method, system, and computer program product embodiments are provided and provide additional advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only embodiments of the invention and are not therefore to be considered to be limiting of its scope, the invention will be described and explained with additional specificity and detail through the use of the accompanying drawings, in which.

DETAILED DESCRIPTION OF THE DRAWINGS

As previously indicated, the illustrated embodiments depict and describe various techniques for improving execution of a RABF cycle by considering overhead calculations for each of a number of possible tape speeds. These embodiments detect the situation where smaller tape speeds result in better throughput than faster tape speeds, and select the slower tape speed. By selecting the slower tape speed in some cases, the embodiments promote tape durability To illustrate the scenario described previously, consider the following example using the following tape speeds. A first tape speed (SP1) has a rate of 10 meters/second (m/sec). A second tape speed (SP2) has a rate of 5 m/s. Two wraps in the temporary area are referred to as ABF1 and ABF2. Following a small amount of transaction data (data sent between the synchronization command) transferred from the host, the drive enters a RABF mode of operation. The drive then writes the next transaction data in the first temporary wrap ABF1. When the full area of ABF1 is written, the drive then moves to the second temporary wrap ABF2. Once the areas of ABF1 and ABF2 are written, the drive moves to the original wrap and recursively writes the data that was written in ABF1 and ABF2. Once the recursive write is concluded, the drive returns to the ABF1 wrap for the next synchronization command. In other words, the RABF cycle is repeated until the host application stops transferring the small data and high frequency of synchronization commands such that the drive exists the RABF mode of operation.

If the length of temporary wraps ABF1 and ABF2 are each 100 meters, the time expended while writing these wraps is as follows. For the faster tape speed SP1, the time expended is (100 m)*(2 wraps)/(10 m/s)=20 seconds. For the slower tape speed SP2, the time expended is (100 m)*(2 wraps)/(5 m/s) =40 seconds. These values indicate that the recursive write process occurs per every 20 seconds (for the faster tape speed) or 40 seconds (for the slower tape speed). Because the occurrence of recursive writes is smaller in the slower tape speed) (every 40 seconds vs. every 20 seconds), any overhead stemming from the recursive writing itself is reduced. This will be further illustrated, following. In addition to the foregoing, the use of slower tape speeds in situations warranting the slower speed promotes durability of the magnetic tape.

Figure 1:
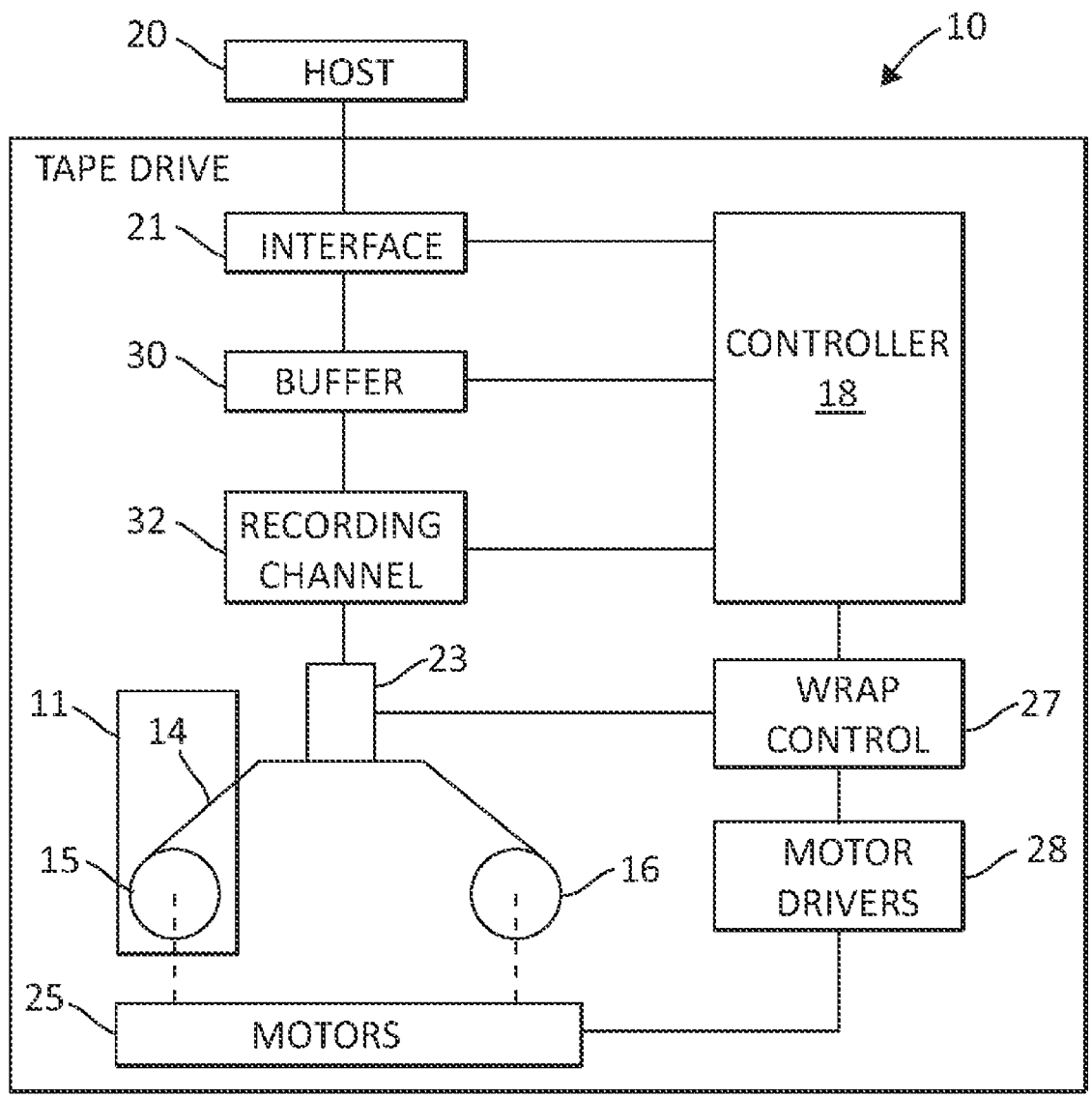
FIG. 1 is a block diagram of an exemplary magnetic tape drive with a magnetic tape cartridge capable of implementing various aspects of the present invention.

Referring to FIG. 1, a tape drive 10 is illustrated which may implement aspects of the present invention. The tape drive provides a means for reading and writing information with respect to a magnetic tape cartridge 11. A cartridge and associated tape drive are illustrated, such as those adhering to the Linear Tape Open (LTO) format. An example of a single reel tape drive is the IBM® 3580 Ultrium® magnetic tape drive based on LTO technology. Another example of a single reel tape drive is the IBM® 3590 Magstar® magnetic tape drive and associated magnetic tape cartridge. An example of a dual reel cartridge is the IBM® 3570 magnetic tape cartridge and associated drive.

As is understood by those of skill in the art, a magnetic tape cartridge 11 comprises a length of magnetic tape 14 wound on one or two reels 15, 16. Also as is understood by those of skill in the art, a tape drive 10 comprises one or more controllers 18 of a recording system for operating the tape drive in accordance with commands received from a host system 20 received at an interface 21. The tape drive may comprise a standalone unit or comprise a part of a tape library or other subsystem. The tape drive 10 may be coupled to the host system 20 directly, through a library, or over a network, and employ the Small Computer Systems Interface (SCSI), Fibre Channel Interface, etc.

The magnetic tape cartridge 11 may be inserted in the tape drive 10, and loaded by the tape drive so that one or more read and/or write heads 23 of the recording system reads and/or writes information with respect to the magnetic tape 14 as the tape is moved longitudinally by one or more motors 25. The magnetic tape comprises a plurality of parallel tracks, or groups of tracks. In some formats, such as the LTO format, discussed above, the tracks are arranged in a serpentine back and forth pattern of separate wraps, as is known to those of skill in the art. Also as known to those of skill in the art, the recording system comprises a wrap control system 27 to electronically switch to another set of read and/or write heads, and/or to seek and move the read and/or write heads 23 laterally relative to the magnetic tape, to position the heads at a desired wrap or wraps, and, in some embodiments, to track follow the desired wrap or wraps. The wrap control system may also control the operation of the motors 25 through motor drivers 28, both in response to instructions by the controller 18. Controller 18 also provides the data flow and formatting of data to be read from and written to the magnetic tape, employing a buffer 30 and a recording channel 32, as is known to those of skill in the art.

As discussed above, magnetic tape provides a means for physically storing data that may be archived or that may be stored in storage shelves of automated data storage libraries and accessed when required. Tape drives often employ a "read after write" process to insure that the data is written correctly to provide an aspect of permanence. This permanence allows copies of the data stored in memory or disk at the host system 20 to be erased, knowing that a correct copy exists on magnetic tape.

Considering the foregoing discussion, one embodiment of a RABF cycle may be defined as follows. First, the tape head moves from the original wrap to the first temporary wrap (again termed ABF1). As a second step, the data is written on the ABF1 wrap. As a third step, the tape head moves from the first to the second temporary wrap (ABF1 to ABF2). Fourth, data is written to the ABF2 wrap. Fifth, the tape head moves from the ABF2 wrap to the original wrap (once the temporary areas are filled). Sixth and finally, the drive recursively writes the data from ABF1 and ABF2 to the original wrap. For each of these steps, a synchronization command may be issued.

The following terminology and assumptions may be used in herein, following:
  A: Acceleration of Tape Speed
  $SP\_x$: Tape Speed
  D: Size of data set (Data set is a unit to be written on tape)
  $S\_x$: Transfer rate of tape speed $SP\_x$
  $n\_x$: The number of data sets to be recursively written with tape speed $SP\_x$
  $R\_x$: The number of synchronization commands during one RABF cycle with tape speed x (ABF1, ABF2, Recursive Write).

In addition, the following transfer rates may be defined, where $m\_1$, $m\_2$, and $m\_3$ represent ratios of current speed to a highest tape speed. These values may be obtained for a particular tape speed x following the performance of one RABF cycle at that tape speed. For example, for a particular computing environment, the following may be obtained:

$$S\_1 = 163 \text{ MB/sec} = S\_1 * m\_1 (m\_1 = 1)$$

$$S\_2 = 143 \text{ MB/sec} = S\_1 * m\_2 (m\_2 = 134/163)$$

$$S\_3 = 109 \text{ MB/sec} = S\_2 * m\_3 (m\_3 = 109/163).$$

Using the foregoing assumptions, an average overhead per synchronization command may be calculated as Overhead_S_x=Time_To_Write_One_Dataset+(Time_To_Recursive_Write+Tape_Motion for One_RABF_Cycle)/R_x. Again, the following assumptions and terminology may be used:
  Time_To_Write_One_Dataset=D/S_x
  Time_To_Recursive_Write=D*n_x/S_x
  Tape_Motion for_One_RABF_Cycle (all six steps of RABF cycle)=(SP_x/A)*6
  Time_To_Wrap_Change_From_Original_to_ABF1= (SP_x/A)*2
  Time_To_Wrap_Turn_From_ABF1_to_ABF2=(SP_x/A)*2
  Time_To_Wrap_Turn_From_ABF2_to_Original=(SP_x/A)*2.

The same average overhead value may then be calculated with respect to an additional speed y and z:

$$\text{Overhead}\_S\_y = D/(S\_x*m\_y) + ((D*n\_x/m\_y)/(S\_x*m\_y) + (S\_x*m\_y/A)*6)/(R\_x/m\_y)$$

$$\text{Overhead}\_S\_z = D/(S\_x*m\_z) + ((D*n\_x/m\_z)/(S\_x*m\_z) + (S\_x*m\_z/A)*6)/(R\_x/m\_z).$$

Once the average overhead values are obtained, the RABF cycle is executed using the tape speed having the smallest calculated average overhead. In other words, given a total time of one RABF cycle, if a calculated average overhead value for a particular tape speed is the smallest of the calculated overhead values, the RABF cycle achieves the best performance using that particular tape speed.

Figure 2:
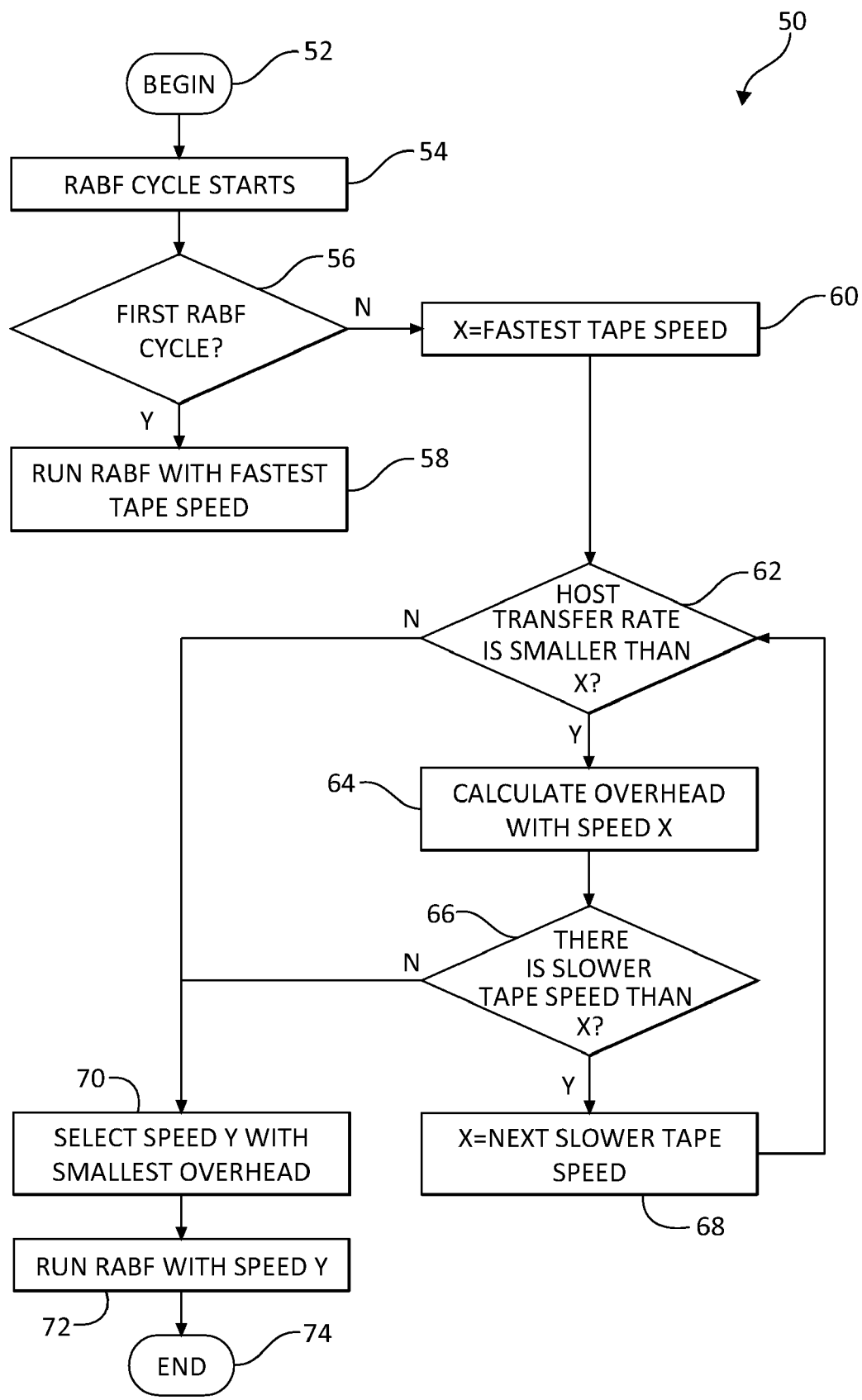
FIG. 2 is an exemplary method for writing synchronous data to magnetic tape, incorporating various aspects of the present invention.

Turning to FIG. 2, an exemplary method 50 for synchronous writing of data to tape incorporating a consideration of overhead values for predefined tape speeds is illustrated. As one skilled in the art will appreciate, various steps in the method 50 may be implemented in differing ways to suit a particular application. In addition, the described methods may be implemented by various means, such as hardware, software, firmware, or a combination thereof operational on or otherwise associated with the magnetic tape drive. For example, the method 50 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

While the method 50 below is presented as an iterative mechanism, the skilled artisan will appreciate that in some embodiments, certain steps in the method 50 may occur in parallel. For example, the calculation of an average overhead value may take place concurrently for each of a number of predefined tape speeds.

Method 50 begins (step 52) as the drive detects a pattern of synchronization commands (synchronizing events) causing it to enter a RABF mode of operation, and the RABF cycle starts (step 54). If this is the first RABF cycle executed in a period of time (step 56), the RABF is performed using the fastest available tape speed (step 58). If the RABF cycle is not the first cycle executed, then X is defined as the fastest available tape speed (step 60). A determination is made as to whether the host transfer rate is smaller than X (step 62). If this is not the case, the tape speed Y with the smallest calculated overhead value is selected (step 70), and the RABF is performed using the selected tape speed (step 72). The method then ends (step 74).

Returning to step 62, if however, the host transfer rate is determined to be smaller than X, then the method 50 calculates the average overhead using speed X (step 64). If a slower tape speed than X is not identified (step 66), then the method again proceeds to step 70 to select the speed Y having the smallest calculated overhead and execute the RABF cycle with the selected speed Y (again, step 72). On the other hand, if a slower tape speed than X is identified (again, step 66), then X is then redefined as the next slower tape speed (step 68). The method 50 then returns to step 62, where the host transfer rate is again examined to determine if it is smaller than the redefined tape speed X. Steps 62-68 continue until a slower tape speed is not identified.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for writing received synchronized data to magnetic tape having a plurality of wraps using a magnetic tape drive adapted for performing the writing according to an available plurality of predefined tape speeds, the method comprising:
   for each of the available plurality of predefined tape speeds, calculating an average overhead per synchronized command for performing a recursively accumulated back-hitchless flush (RABF) cycle;
   selecting one of the available plurality of predefined tape speeds having a lowest calculated average overhead; and
   performing the RABF cycle using the selected one of the available plurality of predefined tape speeds.

2. The method of claim 1, further including, previous to the calculating the average overhead, detecting a pattern of synchronizing events for writing transactions to the magnetic tape, the detecting triggering a RABF mode of operation.

3. The method of claim 2, further including, pursuant to performing the RABF cycle:
   accessing at least one work copy wrap of the magnetic tape with at least one read/write head of the magnetic tape drive,
   writing at least one stored synchronized transaction of the detected pattern from a buffer to the at least one work copy wrap of the magnetic tape,
   upon writing the at least one stored synchronized transaction from the buffer to the magnetic tape, accumulating the at least one stored synchronized transaction in the buffer, and
   subsequently accessing at least one normal wrap of the magnetic tape separate from the at least one work copy wrap, and recursively writing the accumulated transactions from the buffer to the magnetic tape in a sequence.

4. The method of claim 3, further including, if the detecting triggers a first occurrence of the RABF mode of operation in a period of time, performing a first RABF cycle using a fastest tape speed of the available plurality of predefined tape speeds.

5. The method of claim 1, further including, previous to calculating the average overhead, determining if a host transfer rate is smaller than a first tape speed of the available plurality of predefined tape speeds.

6. The method of claim 5, wherein if the host transfer rate is smaller than the first tape speed, performing the calculating the average overhead for the first tape speed.

7. The method of claim 6, wherein if an additional tape speed of the available plurality of predefined tape speeds is slower than the first tape speed, determining if the host transfer rate is smaller than the additional tape speed, wherein if the host transfer rate is smaller, performing the calculating the average overhead for the additional tape speed.

8. A system for writing received synchronized data to magnetic tape having a plurality of wraps using a magnetic tape drive adapted for performing the writing according to an available plurality of predefined tape speeds, the system comprising:
   at least one buffer; and
   a controller coupled to and operating the at least one buffer, the controller including a processor device, wherein the controller is adapted for:
      for each of the available plurality of predefined tape speeds, calculating an average overhead per synchronized command for performing a recursively accumulated backhitchless flush (RABF) cycle;
      selecting one of the available plurality of predefined tape speeds having a lowest calculated average overhead; and
      performing the RABF cycle using the selected one of the available plurality of predefined tape speeds.

9. The system of claim 8, wherein the controller is further adapted for, previous to the calculating the average overhead, detecting a pattern of synchronizing events for writing transactions to the magnetic tape, the detecting triggering a RABF mode of operation.

10. The system of claim 9, wherein the controller is further adapted for, pursuant to performing the RABF cycle:
   accessing at least one work copy wrap of the magnetic tape with at least one read/write head of the magnetic tape drive,
   writing at least one stored synchronized transaction of the detected pattern from the at least one buffer to the at least one work copy wrap of the magnetic tape,
   upon writing the at least one stored synchronized transaction from the at least one buffer to the magnetic tape, accumulating the at least one stored synchronized transaction in the at least one buffer, and
   subsequently accessing at least one normal wrap of the magnetic tape separate from the at least one work copy wrap, and recursively writing the at least one accumulated transaction from the at least one buffer to the magnetic tape in a sequence.

11. The system of claim 10, wherein the controller is further adapted for, if the detecting triggers a first occurrence of the RABF mode of operation in a period of time, performing a first RABF cycle using a fastest tape speed of the available plurality of predefined tape speeds.

12. The system of claim 8, wherein the controller is further adapted for, previous to calculating the average overhead, determining if a host transfer rate is smaller than a first tape speed of the available plurality of predefined tape speeds.

13. The system of claim 12, wherein the controller is further adapted for, if the host transfer rate is smaller than the first tape speed, performing the calculating the average overhead for the first tape speed.

14. The system of claim 13, wherein the controller is further adapted for, if an additional tape speed of the available plurality of predefined tape speeds is slower than the first tape speed, determining if the host transfer rate is smaller than the additional tape speed, further wherein if the host transfer rate is smaller, performing the calculating the average overhead for the additional tape speed.

15. A computer program product for writing received synchronized data to magnetic tape having a plurality of wraps using a magnetic tape drive adapted for performing the writing according to an available plurality of predefined tape speeds, the computer program product comprising a computer-readable storage medium having computer-readable program code portions stored therein, the computer-readable program code portions comprising:
   a first executable portion for, for each of the available plurality of predefined tape speeds, calculating an average overhead per synchronized command for performing a recursively accumulated backhitchless flush (RABF) cycle;
   a second executable portion for selecting one of the available plurality of predefined tape speeds having a lowest calculated average overhead; and
   a third executable portion for performing the RABF cycle using the selected one of the available plurality of predefined tape speeds.

16. The computer program product of claim 15, further including a fourth executable portion for, previous to the calculating the average overhead, detecting a pattern of synchronizing events for writing transactions to the magnetic tape, the detecting triggering a RABF mode of operation.

17. The computer program product of claim 16, further including a fifth executable portion for, pursuant to performing the RABF cycle:
   accessing at least one work copy wrap of the magnetic tape with at least one read/write head of the magnetic tape drive,
   writing at least one stored synchronized transaction of the detected pattern from a buffer to the at least one work copy wrap of the magnetic tape,
   upon writing the at least one stored synchronized transaction from the buffer to the magnetic tape, accumulating the at least one stored synchronized transaction in the buffer, and
   subsequently accessing at least one normal wrap of the magnetic tape separate from the at least one work copy wrap, and recursively writing the accumulated transactions from the buffer to the magnetic tape in a sequence.

18. The computer program product of claim 17, further including a sixth executable portion for, if the detecting triggers a first occurrence of the RABF mode of operation in a period of time, performing a first RABF cycle using a fastest tape speed of the available plurality of predefined tape speeds.

19. The computer program product of claim 15, further including a fourth executable portion for, previous to calculating the average overhead, determining if a host transfer rate is smaller than a first tape speed of the available plurality of predefined tape speeds, wherein if the host transfer rate is smaller than the first tape speed, performing the calculating the average overhead for the first tape speed.

20. The computer program product of claim 19, further including a fifth executable portion for, if an additional tape speed of the available plurality of predefined tape speeds is slower than the first tape speed, determining if the host transfer rate is smaller than the additional tape speed, wherein if the host transfer rate is smaller, performing the calculating the average overhead for the additional tape speed.

* * * * *